(12) United States Patent
Wu et al.

(10) Patent No.: US 6,902,597 B2
(45) Date of Patent: *Jun. 7, 2005

(54) FLOOR STANDING TREATMENT DEVICE

(75) Inventors: Guolian Wu, St. Joseph, MI (US); Ali Kaylan, St. Joseph, MI (US); Andrew D. Litch, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 128 days.

This patent is subject to a terminal disclaimer.

(21) Appl. No.: 10/393,102

(22) Filed: Mar. 20, 2003

(65) Prior Publication Data

US 2004/0182244 A1 Sep. 23, 2004

(51) Int. Cl.⁷ .............................. B01D 35/30; H02K 5/24
(52) U.S. Cl. ................................. 55/459.3; 55/DIG. 37; 96/384
(58) Field of Search .............................. 96/384; 55/418, 55/471, 472, 459.3, DIG. 35, DIG. 37

(56) References Cited

U.S. PATENT DOCUMENTS

| | | | | |
|---|---|---|---|---|
| 4,339,777 A | * | 7/1982 | Gruczelak ................ 360/97.02 |
| 4,526,592 A | * | 7/1985 | Armbruster ................ 96/121 |
| 5,435,817 A | | 7/1995 | Davis et al. ................ 55/337 |
| D362,296 S | | 9/1995 | Schmidt .................... D23/364 |
| 5,536,140 A | | 7/1996 | Wagner et al. ............... 415/119 |
| 5,560,120 A | | 10/1996 | Swanson et al. ............... 34/82 |
| 5,641,343 A | | 6/1997 | Frey .......................... 96/135 |
| 5,738,492 A | * | 4/1998 | Stanko et al. ............ 415/211.1 |
| D402,745 S | | 12/1998 | Termeer et al. ............ D23/364 |
| 6,017,375 A | * | 1/2000 | Duell et al. .................... 55/356 |
| D435,097 S | | 12/2000 | Huang ....................... D23/364 |
| D439,645 S | | 3/2001 | Zemp et al. ................ D23/356 |
| D450,377 S | | 11/2001 | Terpko et al. ............. D23/364 |
| D450,825 S | | 11/2001 | Nakamura et al. ......... D23/364 |
| D451,181 S | | 11/2001 | Miwa ........................ D23/364 |
| D451,182 S | | 11/2001 | Tsuji ......................... D23/364 |
| 6,471,736 B2 | | 10/2002 | Campbell et al. ............ 55/356 |
| 6,478,838 B2 | * | 11/2002 | McSweeney et al. ......... 55/467 |
| 6,494,940 B1 | * | 12/2002 | Hak ........................... 96/224 |
| 6,610,118 B2 | * | 8/2003 | Bryce et al. .................. 55/467 |

FOREIGN PATENT DOCUMENTS

KR 2002057555 A * 7/2002

* cited by examiner

Primary Examiner—Frank M. Lawrence
(74) Attorney, Agent, or Firm—Robert O. Rice; Stephen Krefman; John F. Colligan

(57) ABSTRACT

The present invention relates to a floor standing treatment device that has a mainframe assembly and a back housing removably attachable to the mainframe assembly. The mainframe assembly comprises a fan and a fan scroll through which air is directed. The back housing comprises a one or more side walls wherein a portion of at least one of the sides wall is operable as an extension of the fan scroll. The device may also have a front panel having louvers being adapted to allow optimized air flow into the device.

19 Claims, 9 Drawing Sheets

FLOOR STANDING TREATMENT DEVICE

BACKGROUND OF THE INVENTION

1. Field of the Invention

The present invention relates to floor standing treatment devices such as air purifiers, dehumidifiers, air conditioners or floor heaters, and more particularly to an air purifier that provides reduced noise by providing improved air flow through its louvers and scroll.

2. Background of the Invention

Portable and/or floor standing treatment devices including air purifiers, air conditioners, dehumidifiers, and heaters provide benefits in the home and workplace and are increasing in popularity among consumers desiring to live and work in cleaner and healthier environments.

The movement of air through the floor standing treatment device can create some external noise, which may make the treatment device less useful in certain environments. For example, overly loud treatment devices are not convenient in a home environment where the user maybe simultaneously watching television or listening to a radio. Accordingly, it would be advantageous to provide a floor standing treatment device that is relatively quiet, thereby enhancing its usefulness and versatility.

SUMMARY OF THE INVENTION

One embodiment of the present invention is a floor standing treatment device comprising a mainframe assembly and a back housing removably attachable to the mainframe assembly. The mainframe assembly comprises a fan and a fan scroll through which air is directed. The back housing comprises a one or more side walls wherein a portion of at least one of the sides wall is operable as an extension of the fan scroll.

Another embodiment of the invention is a floor standing treatment device comprising a front panel comprising a plurality of louvers configured to allow air flow into the device, the louvers comprising a first substantially vertical surface facing into the direction of air flow, a second substantially vertical surface facing away from the direction of air flow, a first inclined surface extending above the first substantially vertical surface and a top angled surface configured to connect the first inclined surface with the second substantially vertical surface, a second inclined surface positioned below the first substantially vertical surface, and an upwardly arched surface that connects the second inclined surface to the second substantially vertical surface.

Yet another embodiment of the invention is a floor standing treatment device that comprises a mainframe assembly. The device further comprises a front panel having a plurality of louvers and being removably attachable to the mainframe assembly. The louvers are adapted to allow optimized air flow into the device. The device further comprises a back housing removably attachable to the mainframe assembly. The mainframe assembly comprises a fan and a fan scroll through which air is directed. The scroll being rotated to define about a six degree diffusion angle.

BRIEF DESCRIPTION OF THE DRAWINGS

The accompanying drawings, incorporated in and forming part of the specification, illustrate several aspects of the present invention and together with their description serve to explain the principles of the invention. In the drawings:

FIG. 5b depicts a rear perspective view of the motor mount assembly in FIG. 5a;

DETAILED DESCRIPTION

Figure 1:
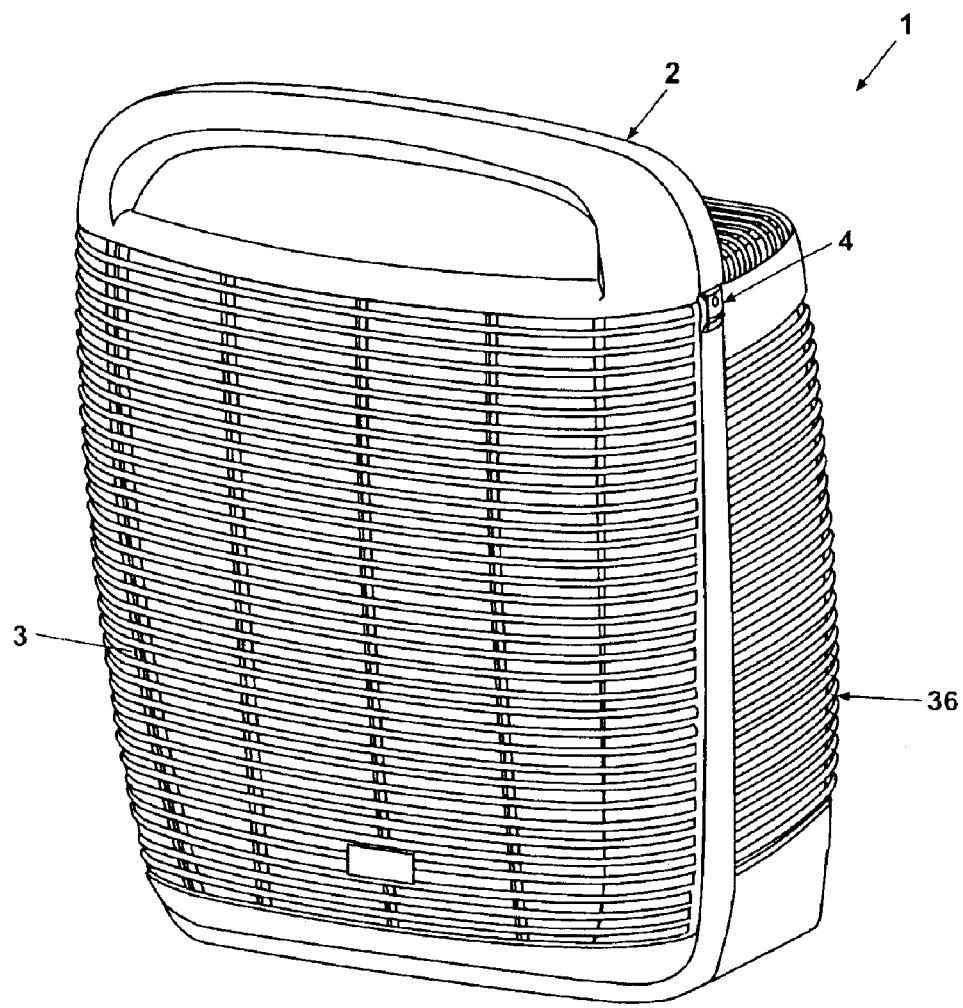
FIG. 1 is a perspective view of a floor standing treatment device, specifically an air purifier, in accordance with an exemplary embodiment of the present invention.
Figure 6:
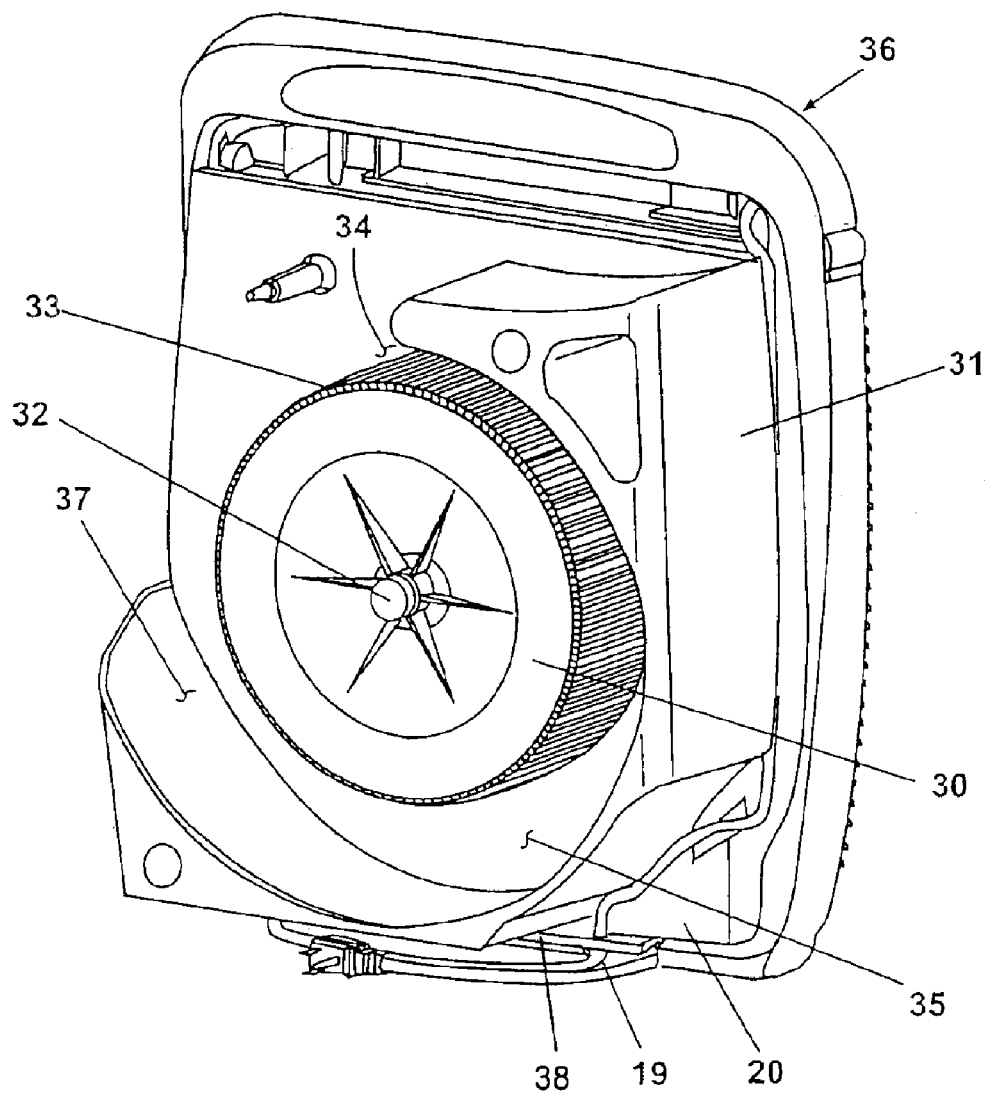
FIG. 6 illustrates the exemplary internal/mechanical components of the floor standing treatment device as shown in FIG. 1.

Referring now to the drawings in detail, wherein like numerals indicate the same elements throughout the views, FIG. 1 illustrates a perspective view of an exemplary embodiment of a floor standing treatment device 1, particularly an air purifier, in accordance with the present invention. The exemplary floor standing treatment device 1 comprises a mainframe assembly 2, a front panel 3 and a back housing 36. The back housing 36 is removably attachable to the mainframe assembly 2 for providing easy access the fan 30 (as best illustrated in FIG. 6) of the air purifier for allowing a user to easily change/clean the fan. As one of skill in the art will recognize, the back housing 36 may be removably attachable to the mainframe assembly 2 in any variety of known ways, and such assembly is easily adaptable to any variety of floor standing treatment device.

The front panel is also removably attachable to the mainframe assembly 2. The front panel 3 may also be attachable to the mainframe assembly 2 in any variety of known ways, but in the exemplary embodiment, the front panel 3 "snap" engages a latching mechanism 4 attached to the mainframe assembly 2 as generally illustrated in FIG. 1. As one of skill in the art should appreciate, the latching mechanism 4 may be integrally or separately attached to the mainframe assembly 2 and may be positioned at virtually any position on the mainframe assembly 2 for allowing secure attachment of the mainframe assembly 2 to the front panel 3. Alternatively, it should also be recognized that the latch assembly may be positioned on the front panel 3 for "snap" engagement with the mainframe assembly 2.

Figure 2:
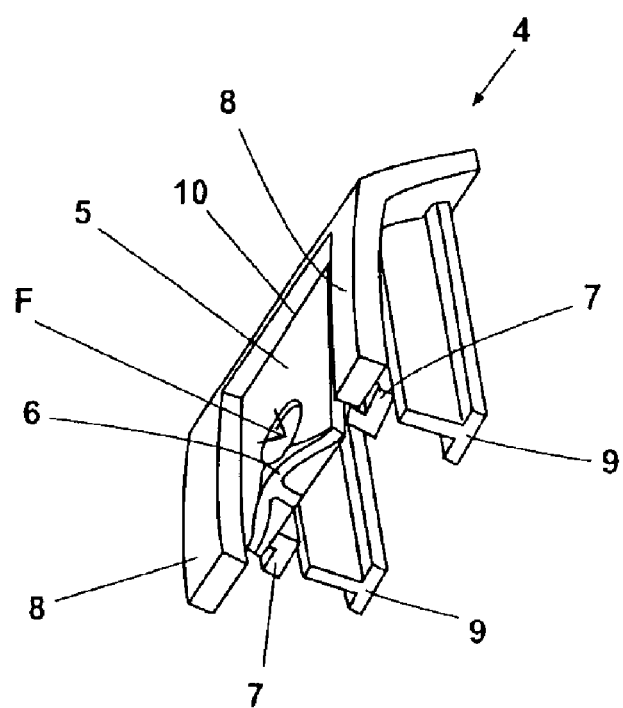
FIG. 2 illustrates a blown-up view of the latching mechanism as shown in FIG. 1.

The exemplary embodiment of FIG. 2 illustrates a blown-up view of the latching mechanism 4 as shown in FIG. 1. The latching mechanism 4 comprises a latch 5 having an arched protuberance 6, guides 7, external stops 8 and internal stops 9. In the exemplary embodiment, the latching mechanism 4 is integrally connected or molded to the mainframe assembly 2. The latching mechanism 4 is also contemplated to be made from a plastic or other suitable material which has elastic properties for allowing lateral or side-to-side movement of the latch 5. For example, in the at rest position as illustrated in FIG. 2, the latch 5 is capable of being moved laterally or side-to-side with a manual force "F" exerted on the latch 5. In the absence of such a force, the material characteristics of the latch should allow the latch 5 to return or rest in the at rest position.

In the event the material chosen does not provide for easy lateral or side-to-side movement, the latch may be further provided with an indentation 10, which provides for improved movability or flexibility of the latch 5. The indentation 10 is contemplated to be a predefined area of the latch that has less thickness than the surrounding area. For example, in the embodiment of FIG. 2, the indentation 10 is the notch that extends the width of the latch 5. The lesser thickness of the indentation 10 area allows the latch to be more flexible and movable with respect to the stationary surrounding mainframe assembly 2.

The latch 5 of the latching mechanism 4 is contemplated to be an integral or molded extension of the mainframe assembly 2. As illustrated, the latch 5 comprises a pair of "L-shaped" guides 7 that extend from the top and bottom of the latch 5. The L-shaped guides 7 extend inward and upward/downward with respect to the latch and are provided to prevent over extension of the latch, which may cause the latch to break or snap from the latching mechanism 4. A pair of external stops 8 and internal stops 9 are also integral or molded extensions of the mainframe assembly 2. The external stops 8 are positioned externally adjacent the guides 7 and are positioned to prevent over-extension of the latch in an outward direction. Similarly, the internal stops 9 are positioned internally adjacent the guides 7 and are positioned to prevent over-extension of the latch in an inward direction. In other words, the stops (8, 9) are configured to prevent the latch 5 from being overly extended in any side-to-side or lateral direction. For example, if the latch 5 is manually pushed in by a user (force "F" in FIG. 1), the guides 7 of the latch 5 abut the internal stops 9 thereby preventing further lateral movement of the latch 5. Conversely, if the latch 5 is manually pulled out by a user, the guides 7 of the latch 5 abut the external stops 8 thereby preventing further lateral movement of the latch 5. In this way, the latch is prevented from being over-extended, which may cause failure of the latch 5.

In the exemplary embodiment as illustrated in FIG. 2, the latch 5 is also provided with an arched protuberance 6, which is contemplated to be an arch that extends outward from the latch 5. The arch is configured to extend a predetermined distance out from the latch 5 such that the protuberance 6 can "snap" engage a corresponding slot 11 positioned on the front panel 3 of the mainframe assembly 2. The snap engagement of the arched protuberance 6 in the corresponding slot 11 allows the front panel 3 to be securely attached to the mainframe assembly 2.

In operation, to place or remove the panel 3 from the mainframe assembly, a user is required to manually push on the latch 5 (force "F") causing the latch to laterally move to a position wherein the protuberance 6 no longer protrudes beyond the external stoppers 8, which allows for insertion/removal of the front panel 3 from the mainframe assembly 2. In this way, the front panel 3 can be easily removed and replaced from the mainframe assembly 2 as desired by the user.

Figure 3A:
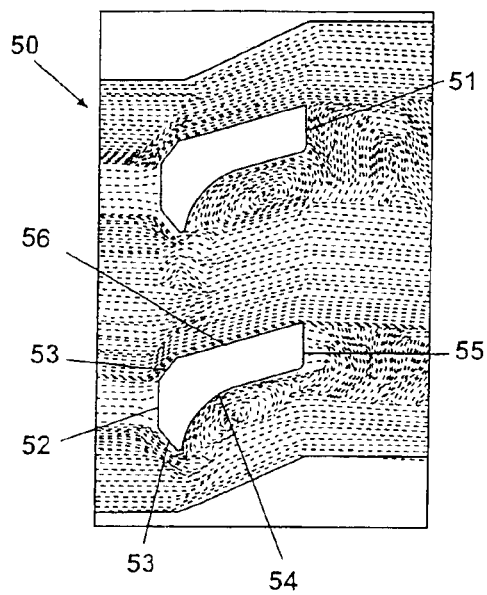
FIG. 3a illustrates a cross-sectional view of an exemplary louver design and a fluid dynamic simulation of air flow through the louver design.
Figure 3B:
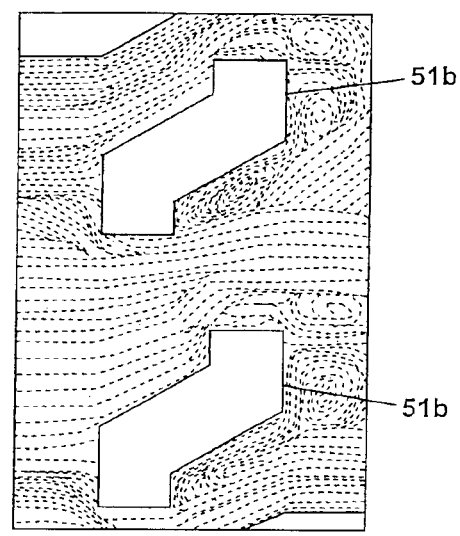
FIG. 3b illustrates a cross-sectional view of a prior art louver design and a fluid dynamic simulation of air flow through the louver design.

FIG. 3a depicts an exemplary fluid dynamic simulation of an embodiment of a louver design 50 associated with the front panel 3 of the floor standing treatment device. The exemplary louvers 51 are configured in such a way that an average height person standing approximately 6 feet away from the device cannot see through the louvers 51 when the product is on the floor under normal lighting conditions. Additionally, as illustrated in FIG. 3a, the louvers 51 are optimized to allow for increased air flow through the louvers 51 than as seen in the louvers 51b of the prior art as shown in FIG. 3b. In particular, the louvers 51 of the present invention allow for more air to pass through the louvers with less pressure drop and less turbulence than the louvers 51b in the prior art. Put another way, more air can be taken in through the louvers at the same velocity than the prior art, or the same amount of air can be taken in as in the prior art design but at a lower overall velocity. In this way, the floor standing treatment device 1, should be quieter than devices of the prior art because more air can be taken in through the louvers 51.

In the exemplary embodiment, the louvers 51 have a generally "boot" shaped appearance, with the "bottom" 52 of the boot facing into the direction of air flow. The bottom of the boot has a substantially flat, vertical surface 52 with inclined surfaces 53 on each side providing some improved aerodynamic performance. The "toe" of the boot is generally formed by one of the inclined surfaces 53 in combination with an upwardly arched portion 54 that follows to the "top" of the boot. The "top" of the boot is a substantially flat, vertical surface 55 that faces away from the direction of the air flow. Lastly, an angled top surface 56 defines the top of the surface of the louver 51 and "back side" portion of the boot.

Figure 4:
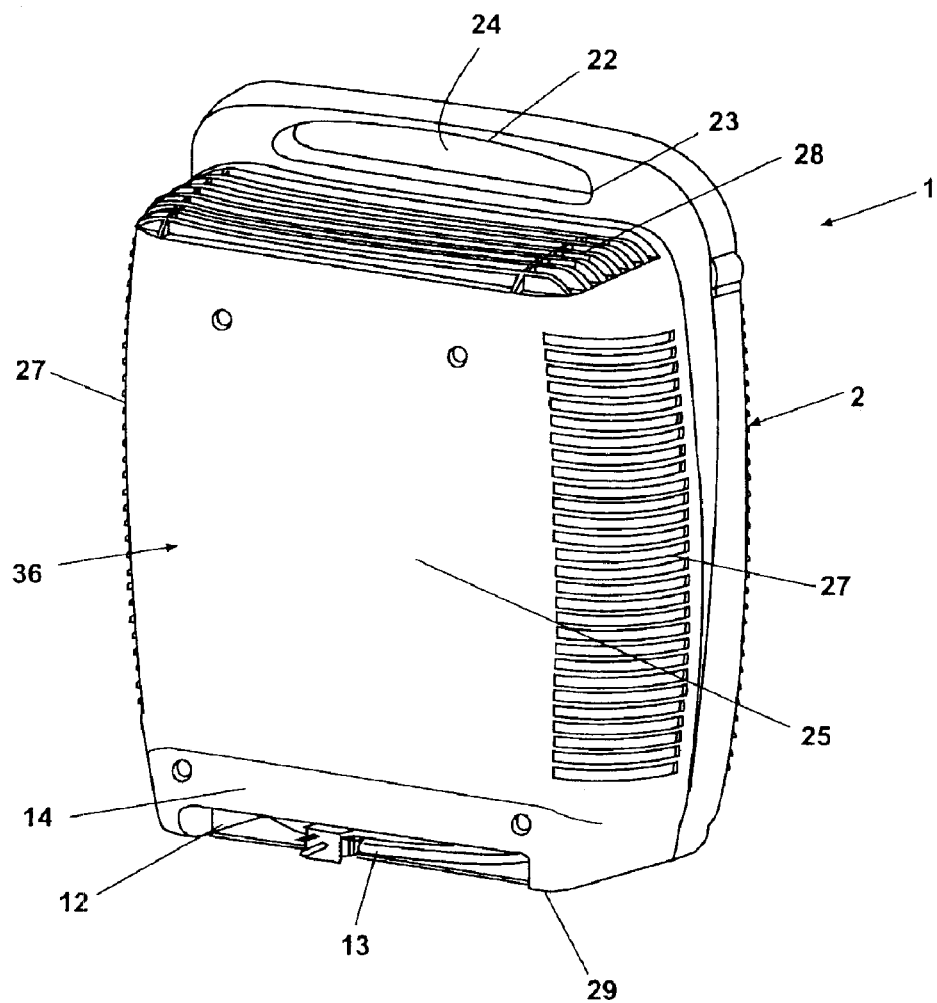
FIG. 4 depicts a rear perspective view of the back housing and mainframe assembly of the floor standing treatment device in accordance with the present invention.

FIG. 4 depicts a rear perspective view of the back housing 36 and mainframe assembly 2 of the floor standing treatment device in accordance with the present invention. The back housing 36 has a back wall 25, two side walls 27, a top surface 28 and a bottom surface 29. As will be described in more detail below, the back housing 36 houses some of the mechanical components of the floor standing treatment device 1 including the fan 30.

As further illustrated in FIG. 4, the mainframe assembly 2 comprises a handle 22 for carrying the floor standing treatment device 1. Since the typical floor standing treatment device, specifically the air purifier is cumbersomely large, a handle 22 may be provided to allow the purifier to be easily moved from one location to another. In the exemplary embodiment, the handle 22 comprises an elongated, curved opening 23 for providing a one or two handed gripping of the air purifier. While the handle 22 could have virtually any shaped opening 23, in this embodiment, the handle has a substantially flat bottom and a curved or arched opening for gripping and moving the air purifier 1. Additionally, it is noted that for convenience the handle is located toward the apex of the mainframe assembly 2.

While the opening 23 of the handle may be designed to be a through-hole, in the exemplary embodiment, the handle has an interior wall 24 which prevents a user from putting his/her fingers through the opening 23. One of the purposes of such a design is to provide a more compact design which provides a more aesthetically pleasing front panel. In particular, such a design allows the handle to be built in the floor standing treatment device without it being visible from a front elevational view.

As further illustrated in FIG. 4, the back housing 36 further comprises an elongated cavity 12 positioned along the bottom surface 29 of the housing 36. The cavity 12 is configured to house the electrical cord 13, or at least a portion of the electrical cord 13, that provides electrical power to the free standing treatment device. While the cavity 12 could be of virtually any shape or size, in the exemplary embodiment, the cavity 12 is roughly rectangular and of sufficient volume to allow the entire electrical cord 13 to be stored therein. Such a design allows the electrical cord 13 to be stored when the floor standing treatment device 1 is not in use such as being carried from one location to another. Additionally, this design allows the unused portion of the cord 13 to be stored when the product is in use, which minimizes any potential hazards associated with a loose cord (i.e. tripping, etc.) and provides for a neater and cleaner appearance.

Referring briefly to FIG. 6, the electrical cord 13 is securely attached to the floor standing treatment device 1 via a cord grommet 19. The cord grommet 19 interfaces with an internal surface 20 of the mainframe assembly 2 to securely attach the electrical cord to the treatment device 1. As one of skill in the should recognize, with the back housing attached to the mainframe assembly, the cord grommet 19 will appear to extend from the ceiling 38 of the cavity 12. However, the grommet 19 could also be adapted to extend from the side walls 21 or the back wall of the cavity.

The design of the grommet 19 being positioned within the elongated cavity 12 allows the free standing treatment device 1 to be placed closely adjacent any wall relative to an electrical outlet (not shown) without interference from a protruding grommet as is typical in the state of the art. For example, typical floor standing treatment devices that rely on use of an electrical power cord have a grommet that protrudes from the exterior of the device. Since grommets are typically stiff and inflexible, any device having such a grommet needs to be pulled out from the wall and cannot be positioned closely adjacent to the wall to allow for clearance of the grommet. Accordingly, the present design eliminates the need for such clearance because the grommet 19 is housed within a cavity 12 associated with the floor standing treatment device 1.

Referring back to FIG. 4, the floor standing treatment device 1 of the present invention may further comprise a recessed portion 14 which further improves the device's adaptability to be placed closely adjacent a wall. In this embodiment, a portion of the bottom of the back housing 36 is curved inward to accommodate for base boards associated with a typical wall. As one of ordinary skill in the art will recognize, the inward curvature of the back housing allows the device 1 to be fit more "snugly" against an interior wall of a home. Accordingly, the combination of the recessed portion 14 of the device and the grommet 19 being positioned within the cavity 12, allows the floor standing treatment device to rest flush with most walls in a home.

Figure 5A:
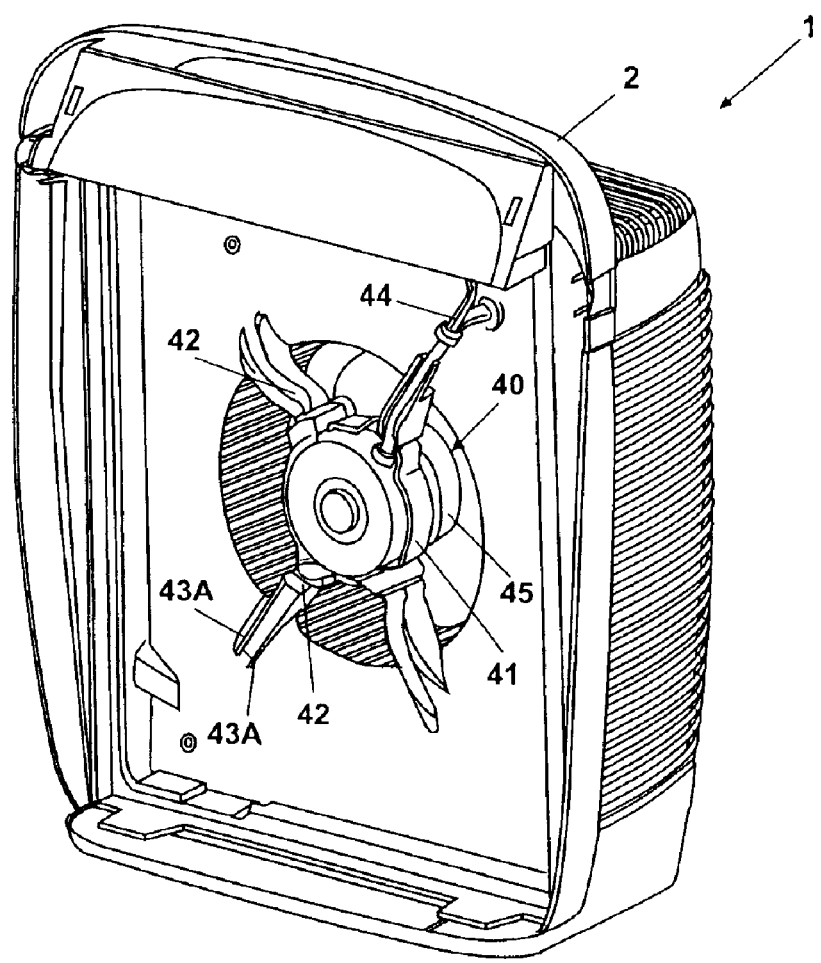
FIG. 5a depicts a front perspective view of a motor mount assembly in accordance with an exemplary embodiment of the present invention.

FIG. 5a illustrates the floor standing treatment device 1 with the front panel 3 removed from the mainframe assembly 2. The mainframe assembly 2 comprises a motor mount assembly 40 that as one of skill in the art will appreciate, was designed with enough structural integrity for the motor and fan to withstand rigorous shipping and handling situations. The motor mount assembly 40 comprises a mount 41 having, preferably, four spaced support ribs 42. The support ribs 42 each comprise two substantially parallel support fins 43a which extend between the mount 41 and the mainframe assembly 2 and provide the structural integrity for the assembly 40. While the present embodiment illustrates four ribs, it should be recognized that more or less ribs could be used.

Not only do the ribs 42 and accompanying fins 43a provide structural support for the mount 41, but the fins have the dual purpose of providing a "guide" for wiring 44 from the motor 45 to the user controls. In this way, the wiring 44 is "neatly" tucked in between the parallel support fins and does not further obstruct airflow.

Figure 5B:
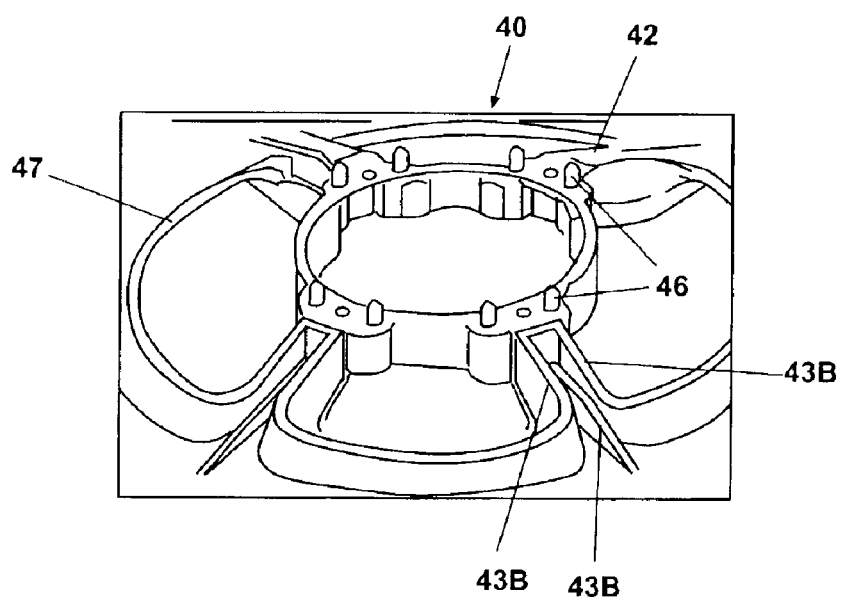

FIG. 5b illustrates the opposite side of the motor mount assembly 40 (i.e. the side facing the back housing 36). This illustration shows the motor mount assembly 40 further comprising a three substantially parallel support fins 43b. Two outer support fins 43b of each rib 42 extend from the mount 41 to the mainframe assembly 2 and form a substantially circular air intake orifice 47. As one of skill in the art should recognize, the air intake orifice 47 is configured to allow air to be pulled through the fan for purification. The third support fin 43b is positioned between the two outer support fins 43b and extends between the mount 41 and onto a portion of the mainframe assembly 2. The third support fin 43b is configured to distribute stresses on the mount 41 to the mainframe assembly 2 thereby providing enhanced structural rigidity to the motor mount assembly 40.

The motor mount assembly 40 may also comprise a plurality of self aligning dowels 46 positioned around the circumference of the mount 41. The dowels 46 are configured to align with corresponding apertures on the motor 45 for providing quick and appropriate alignment of the motor 45 within the mount 41. A plurality of speed clips or Tinnerman® clips might be used to hold the motor in place once it has been inserted on the dowels 46. Speed clips allow "blind" fastening of screws to secure the motor 45. One of the advantages of using such clips is that no securing or holding of a nut is required, thus, a tool to hold the nut is also not required.

FIG. 6 illustrates the internal/mechanical components of the floor standing treatment device, specifically the components of an air purifier 1 including a fan 30 and scroll 31. The fan 30, scroll 31 and other mechanical components of the purifier 1 are generally housed in the mainframe assembly 2 and back housing 36. The fan 30 is mounted to a drive shaft 32 of a motor 45 and generally rotates clockwise about the horizontal drive shaft 32 axis. Additionally, as one of skill in the art should recognize, the fan 30 may also include a plurality of radially spaced blades 33 to help push air through the purifier.

Figure 7A:
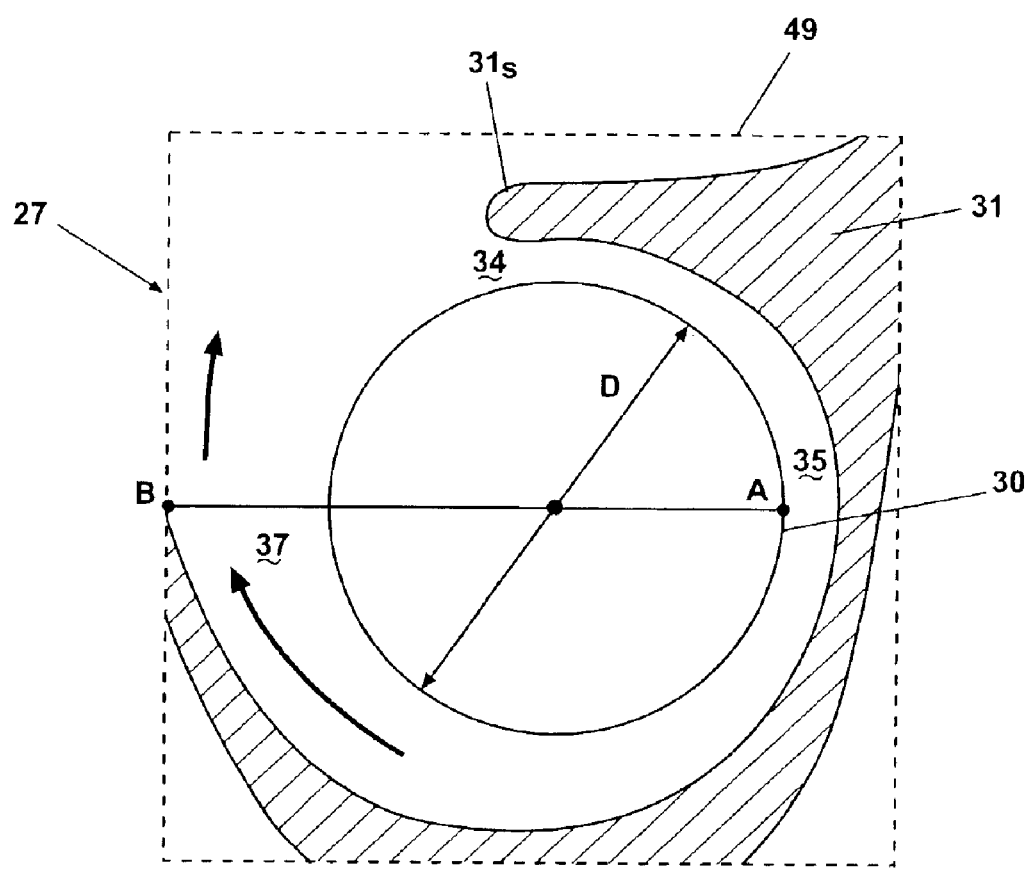
FIG. 7a illustrates a diagrammatic view of a floor standing treatment device.
Figure 7B:
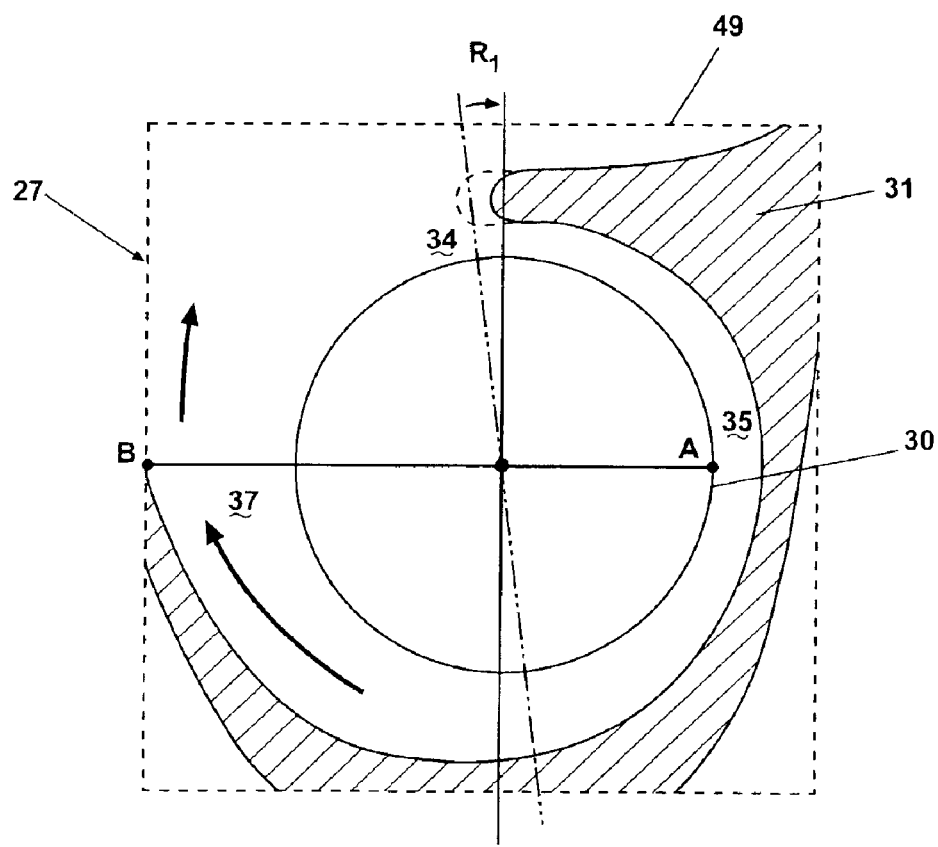
FIG. 7b illustrates an exemplary diagrammatic view of a floor standing treatment device in accordance with the present invention.

FIGS. 7a and 7b diagrammatically illustrate the floor standing treatment device. As shown in this illustration, the scroll 31 mounts to the mainframe assembly 2 and surrounds a portion of the fan 30. In an exemplary embodiment, the scroll 31 is manufactured from expanded polystyrene, or Styrofoam®. The fan's 30 physical relationship to the scroll 31 defines an air opening 34 through which air enters an air passageway 35 and is exhausted through an air outlet 37. As one of skill in the art will appreciate, the size of the air outlet 37 and corresponding expansion angle contributes to the noise level of the purifier while in operation. The expansion angle $\alpha = \arctan[1/\pi(AB/D-1)]$ where D is the diameter of the fan 30 and AB is indicated by the line AB in FIG. 7a. Typically, the larger the air outlet and expansion angle, the quieter the floor standing treatment device is in operation. Accordingly, the challenge presented in creating a quieter floor standing treatment device, without increasing its size, is maximizing the size of the air outlet 37 and the corresponding expansion angle.

FIG. 7a illustrates a typical floor standing treatment device where the rectangular dashed-line 49 represents a predetermined structural outer frame for any given device such as a floor standing treatment device, and line 31s is representative of the scroll 31. In this embodiment, the air passing through air passageway 35, which is exhausted through an air outlet 37, is abruptly altered by side wall 27 of the floor standing treatment device. At the point "B" where the scroll intersects the side wall 27, turbulence is created in the air flow, which results in a drop in pressure and therefor high noise.

FIG. 7b illustrates one exemplary solution to increasing the size of the air outlet 37 and the corresponding expansion angle while maintaining the approximate size of the floor standing treatment device 1. In this embodiment, the scroll 31 is rotated about the drive shaft 32 axis from about 5 degrees to about 6 degrees as indicated by $R_1$ and the side wall of the floor standing treatment device is slightly arched to match the angle of the scroll 31. The result of the rotation means that the vertical side wall 27 of the mainframe assembly 2 acts as an extension of the scroll 31, which minimizes the turbulence generated by scroll 31 intersecting with sidewall 27. Accordingly, the rotated scroll 31 and corresponding curved sidewall 27 results in less turbulence and less noise than the scroll positioning illustrates in FIG. 7a. Put another way, the resulting rotation of the scroll increases both the air outlet and diffusion angle associated with the device, which reduces the noise generated by the floor standing treatment device. Thus, the size of the floor standing treatment device is maintained while the sound produced by the device is lessened.

The foregoing detailed description of the invention has been presented for purposes of illustration and description. It is not intended to be exhaustive nor limit the invention to the precise form disclosed. Many alternatives, modifications and variations have been discussed above, and others will be apparent to those skilled in the art in light of the above teaching. Accordingly, this invention is intended to embrace all such alternatives and variations as discussed without departing from the scope of the invention.

We claim:

1. A floor standing treatment device, comprising:
    a mainframe assembly, and
    a back housing removably attachable to the mainframe assembly, the mainframe assembly comprising a fan and a fan scroll through which air is directed wherein the scroll has been rotated from vertical to define a diffusion angle larger than 5 degrees; the back housing comprising a one or more side walls wherein a portion of at least one of the sides wall is operable as an extension of the fan scroll.

2. The floor standing treatment device of claim 1, wherein the scroll has a diffusion angle of about 6 degrees.

3. A floor standing treatment device, comprising:
    a mainframe assembly, and
    a back housing removably attachable to the mainframe assembly, the mainframe assembly comprising a fan and a fan scroll through which air is directed wherein the scroll is defined by two or more different materials; the back housing comprising a one or more side walls wherein a portion of at least one of the sides wall is operable as an extension of the fan scroll.

4. The floor standing treatment device of claim 3, wherein the two materials are expanded polystryrene and plastic.

5. The floor standing treatment device of claim 1, wherein the scroll at least partly surrounds the fan.

6. The floor standing treatment device of claim 5, wherein the fan is configured to rotate about a horizontal axis.

7. The floor standing treatment device of claim 1, wherein the at least one side wall is positioned substantially vertically for directing air flow in an upward direction.

8. A floor standing treatment device, comprising:
    a front panel comprising a plurality of louvers configured to allow air flow into the device, the louvers comprising a first substantially vertical surface facing into the direction of air flow, a second substantially vertical surface facing away from the direction of air flow, a first inclined surface extending above the first substantially vertical surface and a top angled surface configured to connect the first inclined surface with the second substantially vertical surface, a second inclined surface positioned below the first substantially vertical surface, and an upwardly arched surface that connects the second inclined surface to the second substantially vertical surface.

9. The floor standing treatment device of claim 8, wherein the louvers are configured so that an average height person standing approximately 6 feet away from the device is prevented from seeing through the louvers.

10. The floor standing treatment device of claim 8, wherein the louvers are optimized to allow maximum air flow through the louvers.

11. The floor standing treatment device of claim 10, wherein air flow optimization occurs by allowing increased high velocity air flow through the louvers.

12. The floor standing treatment device of claim 10, wherein air flow optimization occurs by reducing low velocity air flow through the louvers.

13. The floor standing treatment device of claim 10, wherein each louver comprises a boot shape.

14. A floor standing treatment device, comprising:
    a mainframe assembly,
    a front panel comprising a plurality of louvers and being removably attachable to the mainframe assembly, the louvers being adapted to allow optimized air flow into the device, and
    a back housing removably attachable to the mainframe assembly, the mainframe assembly comprising a fan and a fan scroll through which air is directed; the scroll being rotated from vertical to define about a six degree diffusion angle.

15. The floor standing treatment device of claim 14, wherein the back housing comprises a one or more side walls wherein a portion of at least one of the sides wall is operable as an extension of the fan scroll.

16. The floor standing treatment device of claim 14, wherein the scroll is defined by two or more different materials.

17. The floor standing treatment device of claim 16, wherein the two materials are expanded polystryrene and plastic.

18. The floor standing treatment device of claim 14, wherein air flow optimization occurs by allowing increased high velocity air flow through the louvers and reducing low velocity air flow through the louvers.

19. The floor standing treatment device of claim 14, wherein each louver comprises a first substantially vertical surface facing into the direction of air flow, a second substantially vertical surface facing away from the direction of air flow, a first inclined surface extending above the first substantially vertical surface and a top angled surface configured to connect the first inclined surface with the second substantially vertical surface, a second inclined surface positioned below the first substantially vertical surface, and an upwardly arched surface that connects the second inclined surface to the second substantially vertical surface.

* * * * *